United States Patent
Strothmann et al.

(10) Patent No.: US 12,317,772 B2
(45) Date of Patent: Jun. 3, 2025

(54) METHOD FOR OPERATING A ROOT CROP CONVEYING MACHINE

(71) Applicant: Grimme Landmaschinenfabrik GmbH & Co. KG, Damme (DE)

(72) Inventors: Wolfram Strothmann, Osnabrück (DE); Julian Ross, Eslohe (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 18/549,109

(22) PCT Filed: Mar. 9, 2022

(86) PCT No.: PCT/EP2022/056103
§ 371 (c)(1),
(2) Date: Sep. 5, 2023

(87) PCT Pub. No.: WO2022/189537
PCT Pub. Date: Sep. 15, 2022

(65) Prior Publication Data
US 2024/0164249 A1    May 23, 2024

(30) Foreign Application Priority Data
Mar. 12, 2021  (DE) .......................... 102021106119.9

(51) Int. Cl.
*B07C 5/342* (2006.01)
*A01D 17/00* (2006.01)
*A01D 33/00* (2006.01)

(52) U.S. Cl.
CPC ............. *A01D 17/00* (2013.01); *A01D 33/00* (2013.01); *B07C 5/3422* (2013.01); *A01D 2033/005* (2013.01); *B07C 2501/0081* (2013.01)

(58) Field of Classification Search
CPC .. A01D 17/00; A01D 33/00; A01D 2033/005; B07C 5/3422; B07C 2501/0081
See application file for complete search history.

(56) References Cited

U.S. PATENT DOCUMENTS 6,068,059 A * 5/2000 Bajema .................. A01D 33/12
                                                                171/142
12,014,531 B2 * 6/2024 Strothmann ........... A01D 33/00
(Continued)

FOREIGN PATENT DOCUMENTS

DE        2319721 A1    10/1973
DE       19804147 A1     8/1998
(Continued)

OTHER PUBLICATIONS

Hofstee, et al., "Aardappelopbrengst meten met beeldverwerking kan", Apr. 2003.
(Continued)

*Primary Examiner* — Michael McCullough
*Assistant Examiner* — Jessica L Burkman
(74) *Attorney, Agent, or Firm* — Husch Blackwell LLP

(57) ABSTRACT

A method for operating a root crop conveying machine is provided, as well as a root crop conveying machine. Sensor data are recorded by at least one optical sensor. The optical sensor is directed to a measurement region of a flow of harvested material conveyed by at least one conveying element in a conveying direction. On the basis of the sensor data, mass data characterizing at least a mass of at least a part of the harvested material are calculated by an evaluation device. Yield data are calculated and provided by the evaluation device at least on the basis of the mass data. The yield data reflect at least the mass and/or a value calculated on the basis of the mass.

30 Claims, 7 Drawing Sheets

(56) References Cited

U.S. PATENT DOCUMENTS

| | | | | |
|---|---|---|---|---|
| 2016/0113192 | A1* | 4/2016 | Dettmer | A01D 33/08 |
| | | | | 171/83 |
| 2017/0013772 | A1* | 1/2017 | Kirk | A01F 15/071 |
| 2018/0047177 | A1* | 2/2018 | Obropta | G06T 17/20 |
| 2018/0271016 | A1* | 9/2018 | Milano | A01D 33/14 |
| 2021/0059111 | A1* | 3/2021 | Buch | G06N 5/04 |

FOREIGN PATENT DOCUMENTS

| | | |
|---|---|---|
| DE | 102018127844 A1 | 5/2020 |
| DE | 102020112427 A1 | 11/2021 |
| EP | 938837 A1 | 9/1999 |
| EP | 3785516 A1 | 3/2021 |
| JP | 2020153134 A | 9/2020 |
| WO | 2018035082 A1 | 2/2018 |
| WO | 2018115832 A1 | 6/2018 |
| WO | 2021037417 A1 | 3/2021 |

OTHER PUBLICATIONS

Kataoka, et al., "Improving the Conditions of Potato Production by the Automation of Potato Harvesting Tasks Using Machine Vision", Potatoes: Production, Consumption and Health Benefits (2012), pp. 83-97, ISBN: 978-1-62100-703-6.
Third Party Observation submitted Jan. 18, 2024 in corresponding application Serial No. EP22714375.7.

* cited by examiner

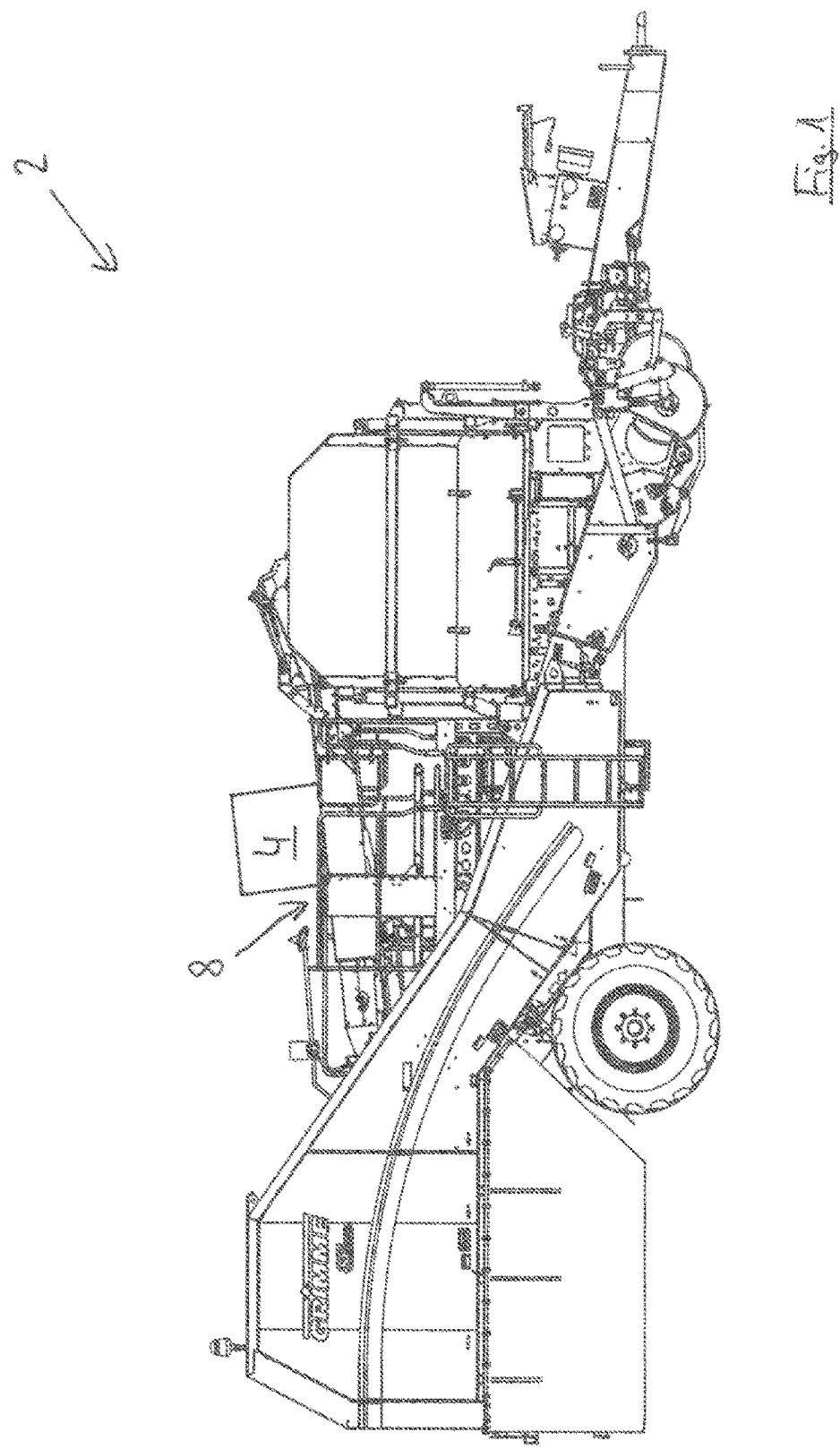

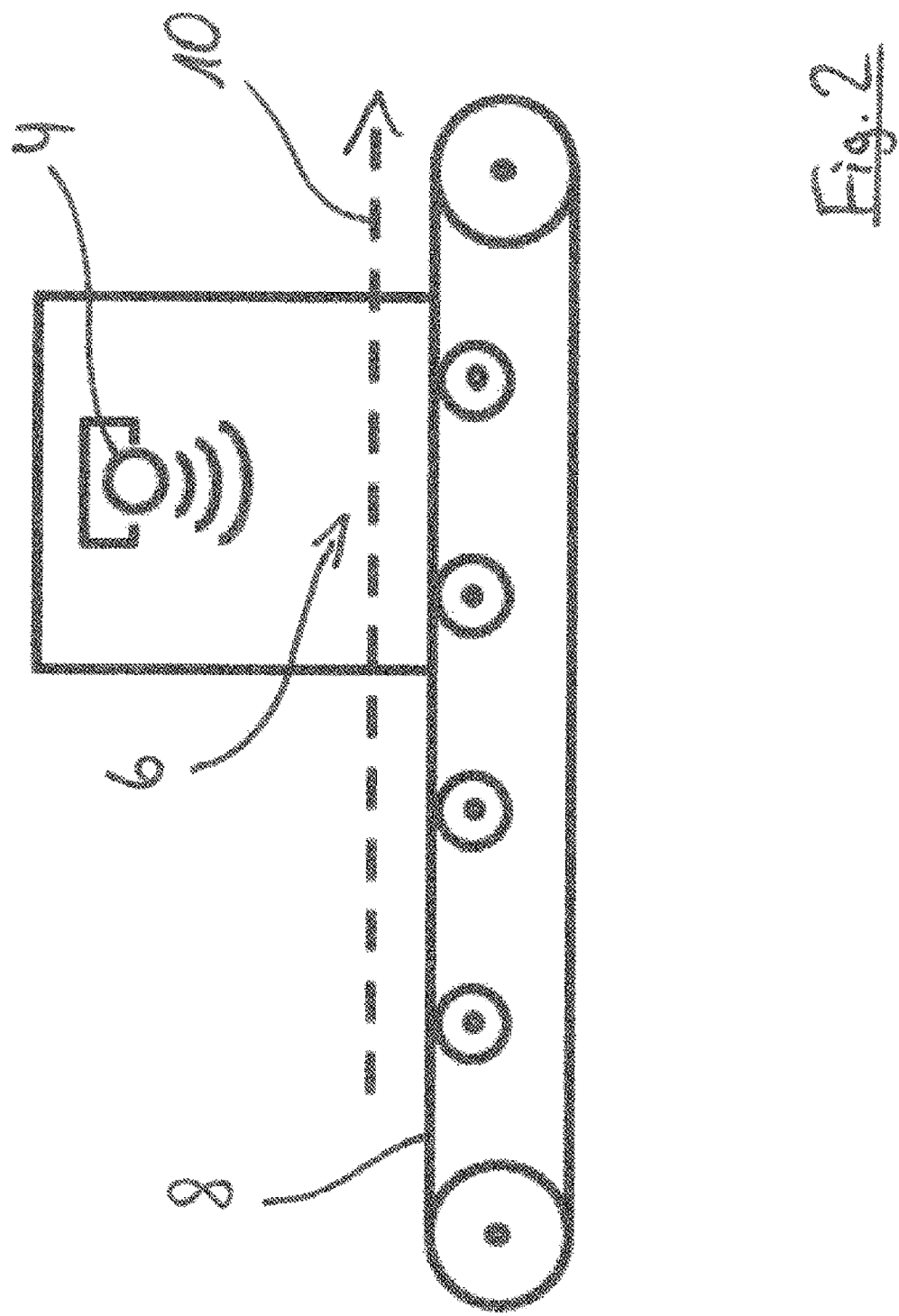

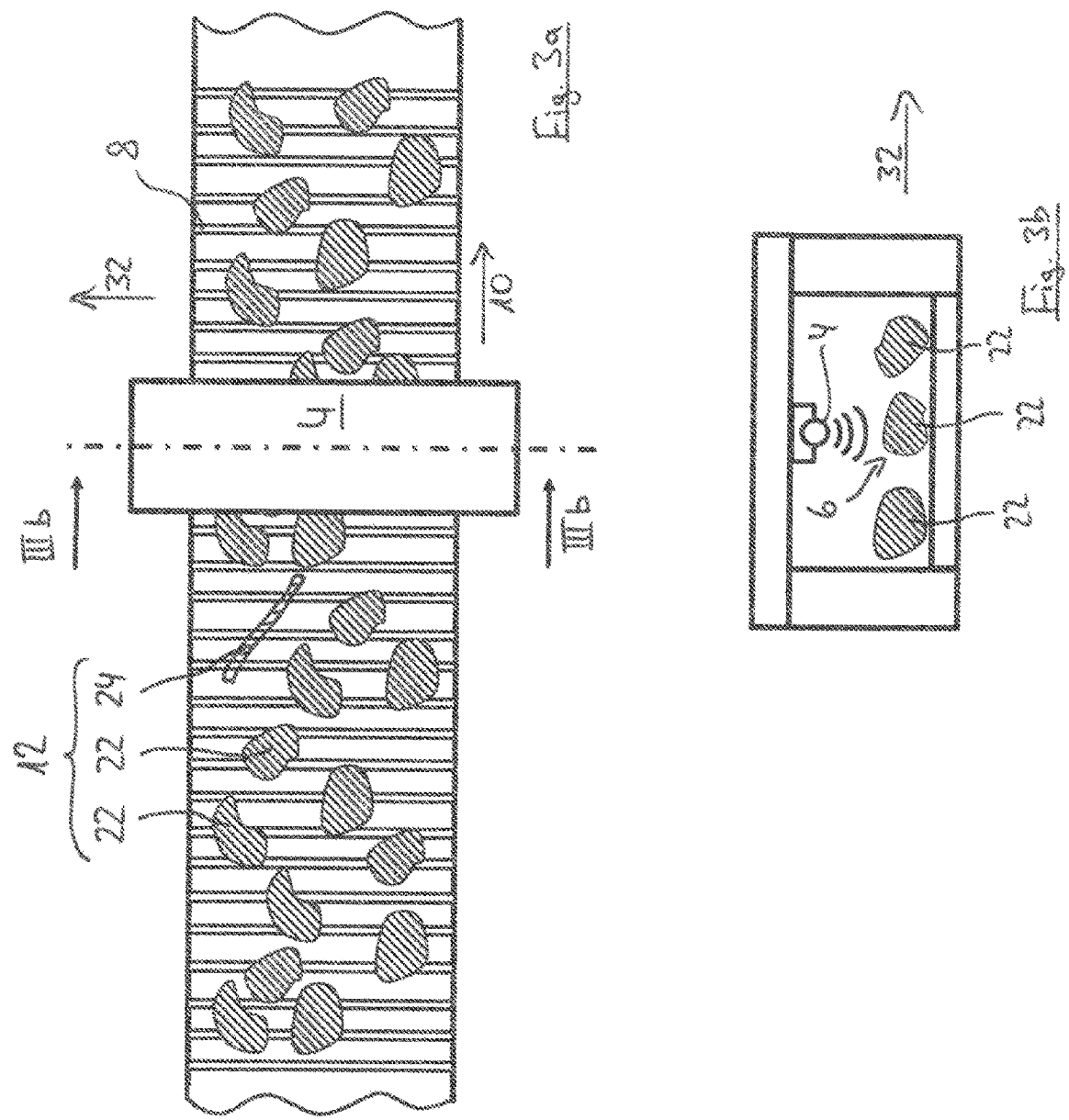

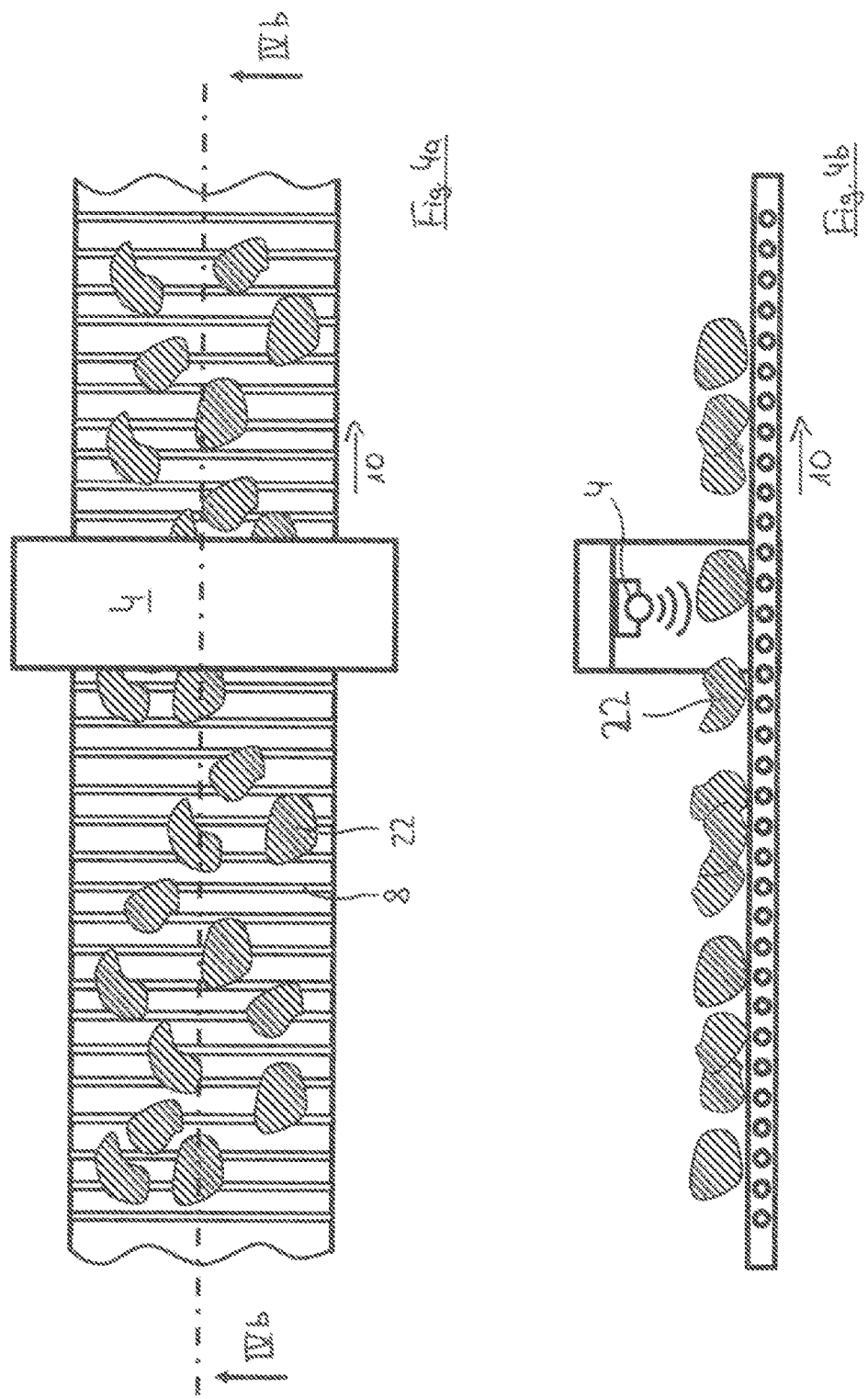

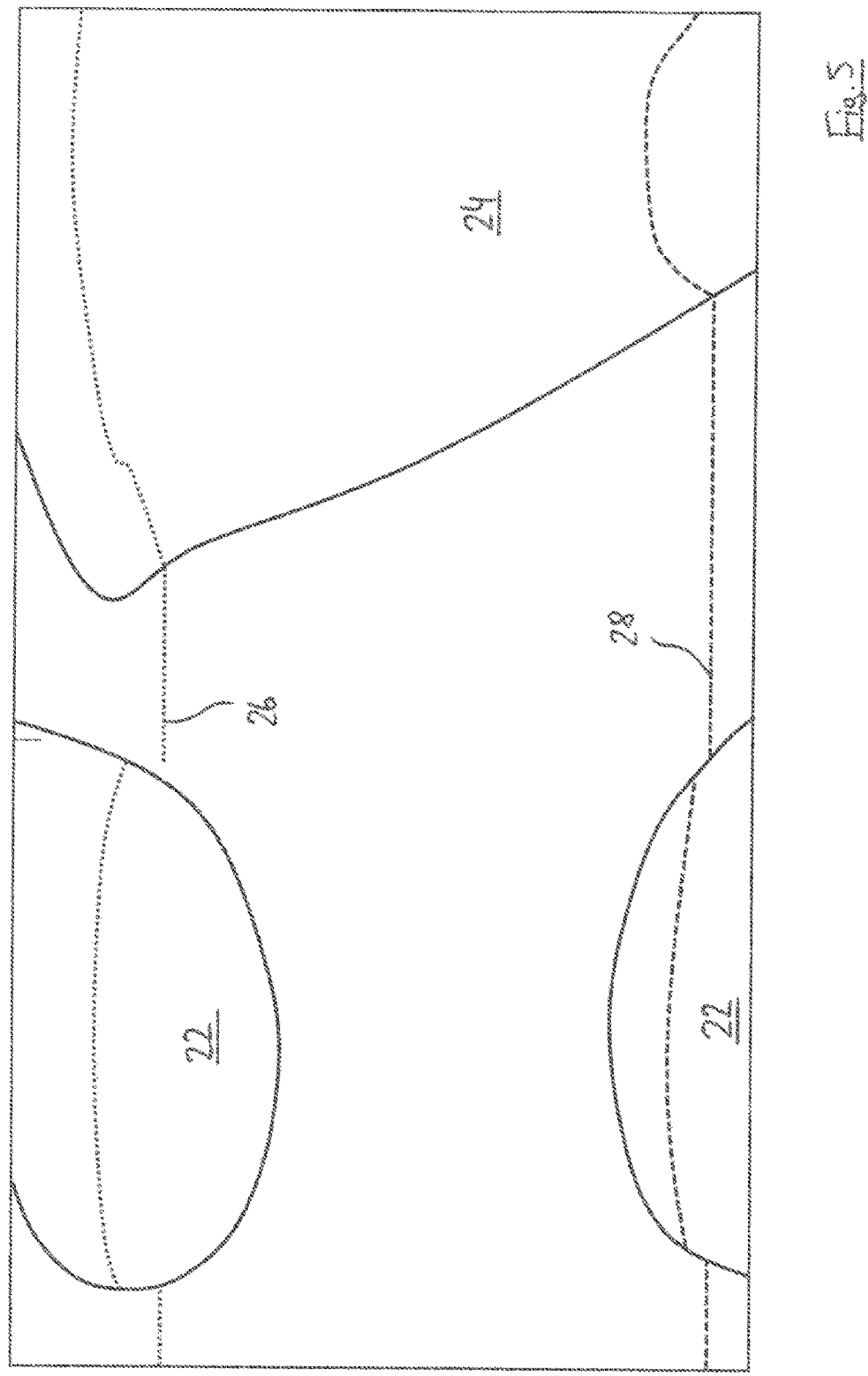

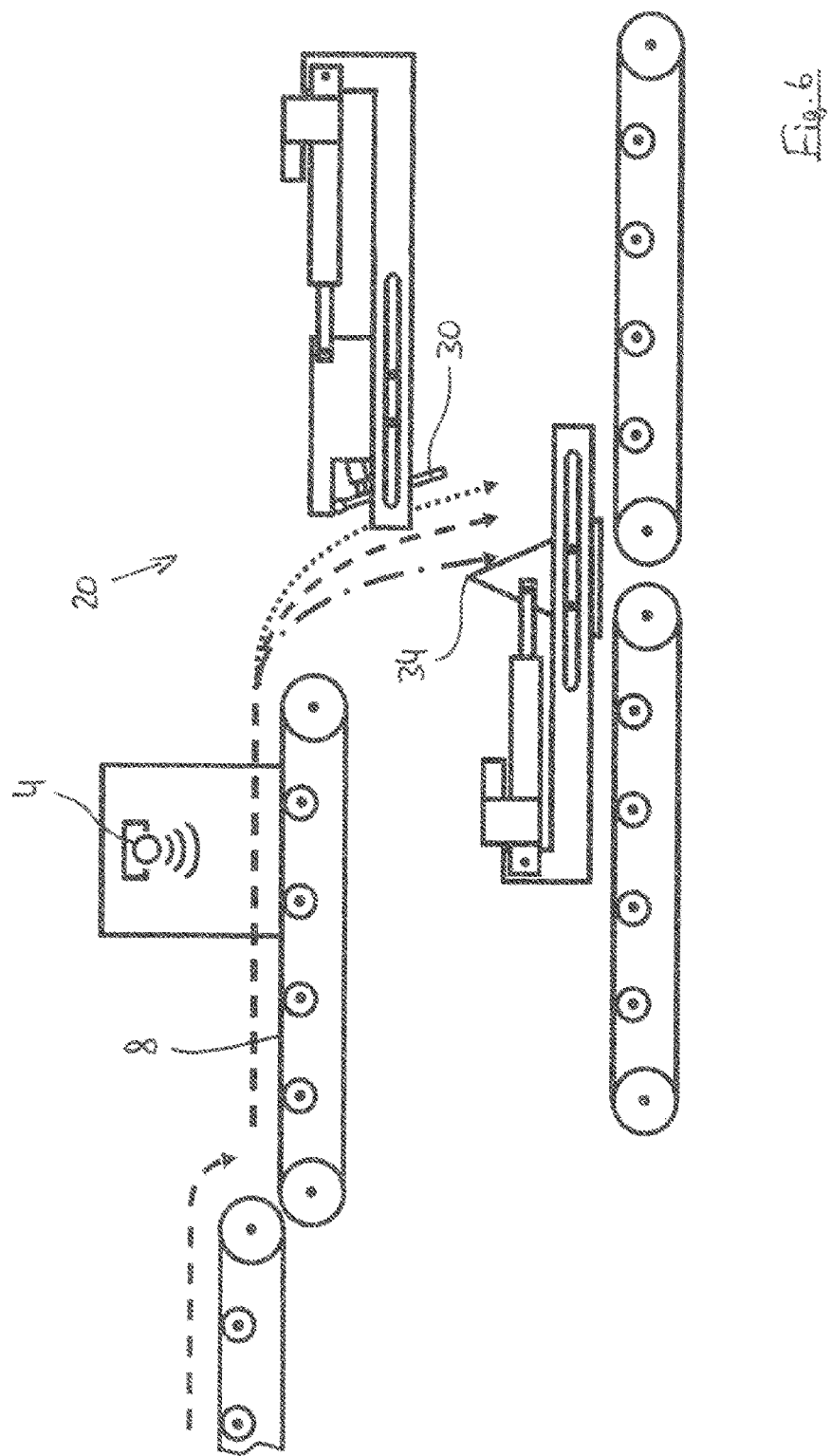

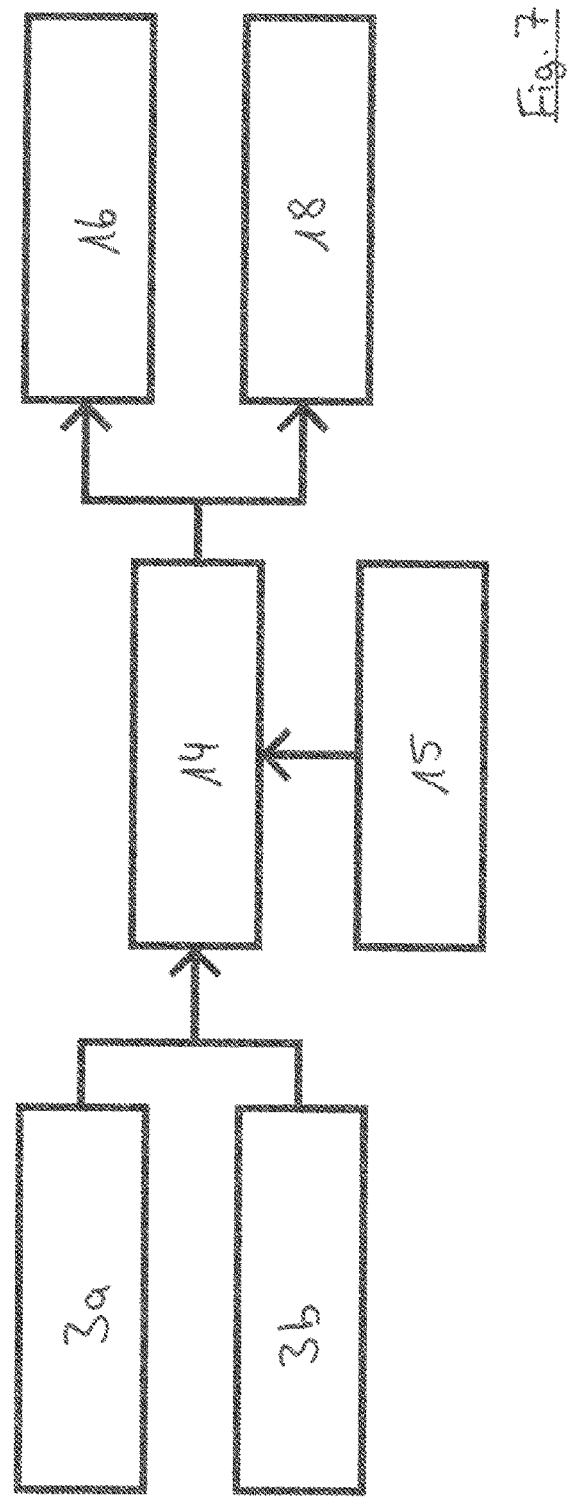

METHOD FOR OPERATING A ROOT CROP CONVEYING MACHINE

CROSS REFERENCE

This application claims priority to PCT Application No. PCT/EP2022/056103, filed Mar. 9, 2022, which itself claims priority to German Application No. 10 2021 106119.9, filed Mar. 12, 2021, the entireties of both of which are hereby incorporated by reference.

FIELD OF THE INVENTION

The invention relates to a method for operating a root crop conveying machine, in particular a root crop harvester, and to a root crop conveying machine, in particular a root crop harvester. According to the method, sensor data are recorded by means of at least one optical sensor. The optical sensor is directed to a measurement region of a flow of harvested material conveyed by at least one conveying element in a conveying direction. On the basis of the sensor data, mass data characterizing at least a mass of at least a part of the harvested material are calculated by an evaluation device. Yield data are calculated and provided by the evaluation device at least on the basis of the mass data. The yield data reflect at least the mass and/or a value calculated on the basis of the mass.

BACKGROUND OF THE INVENTION

Such a method is used in particular for recording a harvested material yield during harvesting and is known in detail from WO 2018 035 082 A1. According to this prior art, the optical sensor is arranged on the root crop conveying machine and comprises the yield data as root crop mass per harvested area.

BRIEF SUMMARY OF THE INVENTION

The object of the present invention is to increase the quality of the harvested material with the least possible design effort.

According to the invention, the object is achieved in that the evaluation device generates an adjustment signal for adjusting at least one separating element at least on the basis of the sensor data, the mass data and/or the yield data. The separating element is comprised by a separating device, which is in particular comprised by the root crop conveying machine. The separating device, in particular the separating element, is designed for separating a first part of the harvested material from at least one further part of the harvested material. In operation, the separating element is arranged along the flow in front of or behind the measurement region. Furthermore, the separating element acts mechanically on at least a part of the harvested material. Preferably, the separating element is adjusted directly by the adjustment signal.

At least some of the data determined for yield detection can thus be used to adjust the separation device. The adjustment signal is particularly suitable and intended for adjusting a separation characteristic of the separating device, for example via the sensitivity of the separating device or via the degree of purity and/or, as this rises, the routinely increasing proportion, in practice, of unintentionally separated, intact crop material. During operation, the adjustment signal is in particular permanently generated or provided by the evaluation device, is applied to the separating device and/or is varied in dependence on the sensor data. The embodiment of the method according to the invention thus allows the separating device to be adapted to the characteristics of the harvested material to be separated with minimum design effort, and the function of the separating device can thus be optimally adjusted depending on the result desired by the operator.

In particular, the optical sensor, the evaluation device and/or the separating device are comprised by or arranged on the root crop conveying machine. Preferably, the method according to the invention can thus be carried out completely by a mobile root crop conveying machine and, if necessary, a tractor coupled thereto.

Within the sense of the invention, root crop conveying machines also include such conveying machines which are designed or suitable for conveying vegetables. Similarly, root crop harvesters also include such harvesters which are designed or suitable for harvesting vegetables. Root crops in this respect also include vegetables, i.e. plant parts, in particular tubers, stems and roots.

The separating device is designed in particular for separating admixtures comprised by the harvested material from root crops comprised by the harvested material. In addition to the separating element, the separating device preferably comprises a further element which cooperates with the separating element. The further element is in particular the conveying element or a further separating element which is in particular identical in design to the separating element. Preferably, the first part comprises exclusively usable root crops and the further part comprises exclusively admixtures and/or unusable root crops, for example of certain sizes. The admixtures include in particular stones, clods, herbage, leaves as well as damaged root crops, wherein the separating device is designed in particular for separating one or more of these admixtures. Alternatively or additionally, the admixtures are root crops of undesirable sizes.

The at least one separating element is designed in particular as a sieve belt, as a closed belt, as a plucking roller, as a hedgehog belt, as a beater device, as an ejector of an ejector line, in particular a pivotable ejector, as a robot arm and/or as a comb element extending into the harvested material from above during operation. The separating element is preferably a component here completely deviating from the conveying element. A mechanical action is an influence from a body by which a movement or an inhibition of a movement is produced. In particular, the separating element acts mechanically on at least a part of the harvested material insofar as this part has, at least in phases, direct contact with the separating element, i.e. touches the separating element. In particular, the separating device has a plurality of preferably similar separating elements. In particular, the separating device forms at least one gap which is permeable to at least some of the admixtures and impermeable to average root crops. The separating element preferably generates a conveying pulse in the direction of the gap.

The optical sensor is designed in particular as a camera, preferably as an optical camera, particularly preferably as a 3D camera. The optical sensor is directed onto the measurement region, which is passed through, during operation, by the conveying element with the harvested material lying thereon. The measurement region is arranged in particular in a stationary manner relative to the machine frame of the root crop conveying machine. The measurement region is in particular the region which is detected or covered by the sensor and/or from which sensor data are recorded which are used to calculate the mass data (wherein the region detected by the sensor can extend beyond the measurement region). The optical sensor generates the sensor data and transmits it to the evaluation device in a wired manner or wirelessly. Preferably, the root crop conveying machine comprises exactly one sensor.

The evaluation device comprises in particular a computing unit or a processor and/or a memory unit and is in particular at least partially comprised by the root crop conveying machine or the tractor. On the basis of stored algorithms, the evaluation device calculates the mass data using the sensor data. The mass data preferably represent a weight of the harvested material or of a part thereof, in particular the weight of the root crops. In particular, the mass data are calculated by multiplying a volume determined by the evaluation device by a density. Preferably, the data comprise a plurality of weights or masses based on sensor data recorded during different time intervals.

The yield data are based at least on the mass data. Preferably, the yield data represent at least one particular mass per particular area harvested. In particular, the yield data comprise a plurality of these ratios. The yield data are provided by the evaluation device. Preferably, the provision is at least visual. Upon being provided, the yield data are preferably stored on a storage medium.

No means not already required for yield detection are required to generate the adjustment signal. This minimizes the effort required for the aforementioned optimization of the harvested material or the effort required for cleaning the root crops.

The method according to the invention is preferably suitable for operating a potato or beet harvester. Harvesters are distinguished by the presence of at least one share blade penetrating the ground during operation. Preferably, the method is also suitable for operating a root crop conveying machine comprising at least one conveying belt, in particular for storing the root crops. Alternatively or additionally, the method is suitable for operating a stationary or mobile root crop cleaning machine.

The operating parameters or the operation of the separating device is in particular dependent on the adjustment signal. Preferably, the adjustment of the separating device is furthermore dependent on input variables to be specified by the user, such as a root crop variety or a minimum purity of the harvested material after having passed through the separating device. Alternatively or additionally to the cleaning of the harvested material, the separating device can be designed for size sorting of the root crops.

The evaluation device is designed in particular in such a way that it carries out a calibration in the event of a lack of harvested material on the conveying element. In particular, a conveying level of the conveying element is detected, which can change during operation due to admixtures adhering to the conveying element and must be taken into account in the yield measurement.

Preferably, the evaluation device uses for the calculation of the mass data and/or for the provision of the yield data at least, among other things, sensor data of that sensor whose sensor data the evaluation device also uses for the generation of the adjustment signal. This means, when using only one optical sensor, that the adjustment signal and the yield data are based on the sensor data recorded by the same sensor. When a plurality of optical sensors are used, this means that at least the sensor data from one of the sensors is used as the basis for both generating the adjustment signal and calculating said data. This ensures that both the adjustment signal and the yield data are based on the best-possible data basis, and a particularly simple solution in terms of design is achieved to provide the advantages described above. These are best provided if the evaluation device accesses the same sensor data both for generating the adjustment signal and for calculating the yield data.

Preferably, the evaluation device for calculating the mass and/or yield data and for generating the adjustment signal distinguishes between root crops comprised by the harvested material and at least some of the admixtures comprised by the harvested material. The evaluation device identifies at least a part of the root crops and/or at least a part of the admixtures on the basis of the sensor data, in particular both the root crops and at least a part of the admixtures.

Preferably, the sensor data are used to identify the contours of individual root crops and/or admixtures in at least one camera image of the sensor. A camera image is understood to be a file output by the sensor, in particular a raw image, which contains information collected at least approximately at the same time and represents the visual situation from the perspective of the sensor. In particular, each camera image is based on exactly one file of the sensor data or each camera image is represented by exactly one file. In particular, the file or the camera image comprises Information on resolution, brightness, etc. The contours are matched in particular with stored reference contour profiles. On the basis of stored data, in particular concerning typical sizes and/or shapes of the root crops, the volume of the root crops is then preferably determined and, particularly preferably, their mass is calculated on this basis.

Alternatively or additionally, the shape and/or the position of surface portions of the root crops or admixtures visible from the sensor are identified. In particular, the evaluation device calculates at least a proportion of the root crops in the harvested material and/or at least a proportion of the admixtures in the harvested material. This makes it possible to determine the quality or the degree of purity of the harvested material and to adjust the separating device depending on this.

In an advantageous embodiment of the invention, the evaluation device calculates at least a number of root crops comprised by the harvested material, at least on the basis of the sensor data. For this purpose, again preferably the contours of the individual root crops are determined. In particular, taking into account the mass data, a size distribution of the root crops can be concluded on the basis of the number, and the separating device can be adjusted accordingly. Alternatively or additionally, the evaluation device calculates at least one dimension of at least a part of the root crops. The dimension is in particular a length, width, height, orientation or a volume and in particular is directly usable for adjusting the separating device.

Preferably, the evaluation device generates the adjustment signal in dependence on property data, in particular size data, and/or a property distribution, in particular size distribution, of the root crops. The property distribution is calculated on the basis of the sensor data. The property data characterize a property of at least one component of the harvested material, such as a root crop, and are calculated on the basis of the sensor data. The size data characterize a size of at least one root crop and are calculated on the basis of the sensor data.

Preferably, the evaluation device calculates the yield data at least by assigning at least some of the property data or size data or data based thereon or the property distribution or size distribution or data based thereon to position data or batch data. The position data are determined in particular by means of a GPS sensor, which is preferably arranged on the root crop conveying machine. Through this assignment, the selling of stored root crops can be better planned, since the different quality or size categories can be located and sold in a targeted manner.

Preferably, the evaluation device calculates the yield data at least by assigning at least a part of the mass data or data based thereon to position data or batch data. In response to the assignment, the evaluation device preferably outputs how large the yield is on at least a certain part of a field area. Batch data characterize in particular such a part of the harvested material which is processed spatially collected, transported by a matching transport vehicle and/or stored within the same container. By assigning the mass data to the batch data, the information contained in the mass data can be specifically assigned to each batch and the order of removal of the batches can be determined, for example, on the basis of yield or batch data relating to the quality of the root crops.

Particularly preferably, the evaluation device virtually reproduces a field area on which the root crop conveying machine is used on the basis of the position data. In addition, the evaluation device subdivides the virtually reproduced field area into area sections, which in particular are at least predominantly of the same size. In particular, all those area sections which do not border on an outer contour of the virtually simulated field area are of the same size. The evaluation device preferably assigns at least a part of the mass data or data based thereon to each area section. Thus, not only the yield of the field area can be determined and automatically assigned by a GPS-based field area identification, but alternatively or additionally the mass data can also be locally highly resolved.

Preferably, the flow of harvested material in the measurement region is irradiated with laser light by means of at least one laser device at least substantially along a line. The main direction of extent of the line is arranged here in particular at an angle, preferably at right angles, to the conveying direction. Due to the surface, which is composed of several harvested material components and is in practice uneven, on which the laser light impinges, a line profile varying in height results. The line profile, in particular its development over time, is in particular the basis for contour identification. The sensor records light from the laser device scattered and/or reflected by the flow or measures its intensity, preferably with a high resolution. The laser device comprises in particular a laser light source and is preferably designed as a line laser. By measuring the scattered and/or reflected light, the surface structure of the harvested material can be determined particularly reliably. In particular, defects, damage, a soil coating and a structure of the root crops can be determined in this way.

In an advantageous embodiment of the invention, the flow is irradiated with laser light by means of the laser device at least substantially along at least two lines. The lines run in a portion of an imaginary conveying plane, the size of which corresponds to the support surface provided by the conveying element, preferably in such a way that they do not intersect. Particularly preferably, the lines run parallel. In this case, the laser device preferably comprises at least two laser light sources. The main directions of extent of the lines are each arranged at an angle, preferably at right angles, to the conveying direction. This allows the aforementioned properties to be established along two lines. Preferably, the flow is irradiated with laser light by means of the laser device at least substantially along at least three lines which are oriented relative to each other as described above.

Preferably, the evaluation device uses sensor data forming the basis of a first camera image and sensor data forming the basis of at least a second camera image to identify at least one image portion of at least one of the camera images that shows at least part of a background. Preferably, the camera images are recorded by the same sensor one after the other. Thus, the camera images show largely the same elements. Subsequently, the at least two camera images or the sensor data on which they are based are preferably set against each other and the images are optically subtracted from each other. In particular, the evaluation device modifies at least part of the sensor data in such a way that the image portion is at least partially removed from the camera image. Preferably, the evaluation device identifies the at least one image portion at least, among other things, on the basis of path data representing a path distance. The path distance is the distance that the conveying element has traveled in the conveying direction between the recordings of the two camera images. The path distance is preferably determined by a rotary encoder on the conveying element. One of the camera images is pushed back by the path distance during the comparison, in particular optically. Since the parallel lines are stationary relative to the optical sensor, only the image structures made recognizable by the laser device remain in the resulting difference image. On the basis of these, different gray values or reflection properties can be determined particularly reliably. These preferred features allow the sensor data described above to be processed in a more targeted manner. Overall, the data basis can thus be concentrated on relevant parts.

Particularly preferably, the flow is irradiated along a first of the lines with laser light of a first wavelength and along a second of the lines with laser light of a second wavelength different from the first wavelength. In particular, both wavelengths are >=400 nm and/or <=1,000 nm. The different wavelengths make it easier to determine different properties of the harvested material and thus achieve a more sound data basis for generating the adjustment signal. The number of different wavelengths corresponds in particular to the number of lines.

Preferably, the optical sensor has at least one monochrome camera. The sensor data include in particular gray values and/or depth information. By using a monochrome camera, which preferably records only brightness information or one gray value per pixel, unnecessary amounts of data can be avoided and all relevant information can be obtained, in particular based on the use of the laser light described above. By using the depth information, additional information regarding the shape as well as the position of the harvested material on the conveying element can be obtained.

The distinction made by the evaluation device between at least one root crop and an admixture is preferably made at least on the basis of an extent of reflection and/or backscattering of the laser light by the respective imaged surfaces. The backscattering is decisively influenced here by how deeply the light penetrates into the respective component and how it scatters within the component. In particular, the gray values of the different pixels are compared and preferably brightness gradients are compared along a direction angled to the line or lines.

The separating device is preferably arranged downstream relative to the measurement region and in relation to the flow of harvested material. In particular, the separating device is designed here to separate admixtures from the root crops. This arrangement of the separating device allows it to be adjusted by the adjustment signal even in response to short-term changes in the composition of the harvested material. Preferably, the root crop conveying machine comprises at least one further optical sensor downstream of the separating device, which records further sensor data for checking the separation result. This allows the separating device to be adjusted particularly effectively.

Preferably, the evaluation device generates the adjustment signal in dependence on a position of the identified component to be separated, in particular an admixture, of the harvested material with respect to a transverse direction. The transverse direction runs horizontally and at right angles to the conveying direction. In this way, the component can be selectively separated from the rest of the harvested material without generating unnecessary rejects in regions offset along the transverse direction. In particular, based on the adjustment signal, the at least one separating element can be moved only locally or can be moved locally more than elsewhere.

Preferably, the adjustment signal or its change is dependent on a conveying speed of the conveying element. In particular, if the adjustment signal is dependent on individual harvested material components to be identified, the evaluation device preferably calculates the time at which an identified harvested material component reaches the separating element in order to adjust the configuration of the separating element by then. Preferably, the inertia with which the evaluation device reacts in the form of the adjustment signal to different harvested material quantities, root crop: admixture ratios or the like is adjustable.

Particularly preferably, a plurality of separating elements of the separating device, which are arranged next to each other in the conveying direction and are designed as ejector elements, can be activated by the adjustment signal. Activation of one of the ejector elements depends here in particular on a position of an identified component to be separated, in particular an admixture, of the harvested material in relation to the transverse direction. The separating device has in particular at least five ejector elements, which are distributed over the width of the conveying element and which are designed to act on at least part of the harvested material, in particular in the region of a drop stage. By using such a separating device, the separation can be implemented particularly effectively.

Preferably, the position of a separating edge comprised by the separating device, which is in particular formed by the separating element, for separating root crops and admixtures is adjusted by the adjustment signal. The separating edge is arranged, in particular with respect to a vertical direction, below the ejector elements. The separating edge is optionally designed to be circumferential in operation. The separating edge serves in particular to direct the parts of the harvested material to different partial flows depending on their flight properties within the drop stage or an action of an ejector element within the drop stage. Such a design of the separating device has proven to be particularly effective in the field of root crops.

The evaluation device preferably calculates the yield data at least on the basis of operating characteristic data of the root crop conveying machine, in particular on the basis of a travel speed and/or a position of share blades of the root crop conveying machine. In particular, in the absence of a GPS sensor, the travel speed can be used to determine a reliable yield specification depending on the harvested area portion. The position of the share blades is preferably used here to distinguish an inactive status of the root crop conveying machine from an active status.

The conveying element preferably forms a plurality of root crop receiving regions which are located at least in portions at a lower level and which are delimited from one another both in the conveying direction and in the transverse direction orthogonal thereto by longitudinal and transverse separating elements of the conveying element. In particular, the conveying element has barrier elements extending both in the transverse direction and in the conveying direction, which prevent the root crops from passing from one root crop receiving region to another root crop receiving region. This makes it easier to distinguish the different harvested material components from one another and, in particular when using the ejector elements, to separate them in a more targeted manner.

The object is furthermore achieved by a root crop conveying machine, in particular a root crop harvester, which has at least one conveying element, at least one optical sensor and an evaluation device. According to the invention, the root crop conveying machine is designed to carry out the method described above and/or below. This means in particular that it comprises a separating device with a separating element.

The root crop conveying machine is preferably designed as a potato harvester or a beet harvester. The root crop conveying machine preferably has at least one share blade that projects into the ground during operation. The share blade is designed in particular in such a way that, during operation, the tubers are lifted out of the ground and are subsequently conveyed away from the share blade by circulating conveying elements, in particular sieve belts. In particular, downstream of the share blade there is arranged a plurality of adjacent conveying elements, and also, preferably, a bunker for storing the tubers, into which the flow of harvested material flows during operation until the bunker is emptied.

Preferably, the root crop conveying machine comprises a plurality of optical sensors which are directed to different and in particular non-overlapping measurement regions, in particular conveying elements. Preferably, the root crop conveying machine also comprises a plurality of, in particular, different separating devices for which different adjustment signals are generated. Preferably, the adjustment signal of each separating device is based on the sensor data of exactly one sensor or on sensor data of a plurality of sensors.

The root crop conveying machine is designed in particular as a stationary or mobile machine. Preferably, it is a transfer or cleaning machine. In particular, the root crop conveying machine comprises a chassis.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a side view of a root crop harvester according to the invention.

FIG. 2 is a schematic representation of a first conveying element with an optical sensor.

FIGS. 3a-4b are schematic illustrations of a second conveying element with an optical sensor.

FIG. 5 is a schematic representation of an image recorded by the optical sensor.

FIG. 6 is a schematic representation of a separating device.

FIG. 7 is a schematic flow chart of an embodiment of a method according to the invention.

DETAILED DESCRIPTION OF THE DRAWINGS

The features of the exemplary embodiments according to the invention explained below can also be the subject of the invention individually or in combinations other than those shown or described. Where useful, functionally equivalent parts are provided with identical reference signs.

The method according to the invention is applied in particular to a root crop harvester 2 according to FIG. 1. The root crop harvester 2 comprises a plurality of conveying elements 8 and an optical sensor 4, which is shown only schematically in FIG. 1. FIG. 2 shows the conveying element 8 of the root crop harvester 2 above which the optical sensor 4 is arranged. During operation of the root crop harvester 2, the strand of the conveying element 8 closer to the optical sensor 4 is moved along in the conveying direction 10. The optical sensor 4 is directed here onto a stationary measurement region 6.

According to the method according to the invention, sensor data 3a, 3b are recorded by means of the optical sensor 4. The optical sensor 4 is directed here onto the measurement region 6, through which a flow of harvested material 12 is moved by the conveying element 8 in the conveying direction 10 (see also FIGS. 3a-4b). The harvested material 12 comprises root crops 22 and admixtures 24, of which a herbage component is shown by way of example in FIG. 3a.

In particular, the optical sensor 4 is arranged in an enclosure open to the conveying element 8 in the conveying direction 10 (cf. FIGS. 3b and 4b). In particular, this enclosure also encloses the conveying element 8 in a transverse direction 32.

On the basis of the sensor data 3a, 3b, an evaluation device 14 calculates mass data characterizing at least a mass of at least part of the harvested material 12. Thereupon, the evaluation device 14 provides yield data 16 calculated at least on the basis of the mass data. The yield data 16 reflect at least the mass and/or a value calculated on the basis of the mass. According to the method according to the invention schematically shown in FIG. 7, the evaluation device 14 draws on stored basic data 15, in particular from a memory of the evaluation device 14, for calculating the yield data 16, said data including, for example, a density of the root crops 22.

The evaluation device 14 also generates an adjustment signal 18 for adjusting at least one separating element of a separating device 20, in particular comprised by the root crop harvester 2 (cf., for example, FIG. 6). The adjustment signal 18 is generated here at least on the basis of the sensor data (3a, 3b), the mass data and/or the yield data 16. The separating device 20 is designed to separate a first part of the harvested material 12 before a further part of the harvested material 12, wherein in the present example the first part is root crops 22 and the further part is admixtures 24. For calculating the yield data 16 and for generating the adjustment signal 18, the evaluation device 14 uses sensor data 3a, 3b of the same optical sensor 4 or sensor data 3a of a first optical sensor 4 and further sensor data 3b of a further optical sensor 4 (cf. FIG. 7). For calculating the mass data, the evaluation device 14 distinguishes root crops 22 comprised by the harvested material 12 from admixtures 24 comprised by the harvested material 12. In addition, the evaluation device 14 calculates a number as well as a measure of the root crops 22 moved through the measurement region 6 on the basis of the sensor data 3a, 3b. The evaluation device 14 calculates the yield data 16 by assigning the mass data to position data determined by means of a GPS sensor (not shown).

The flow of harvested material 12 is irradiated with laser light in the measurement region 6 by means of a laser device along second lines 26, 28 (cf. FIG. 5). The lines 26, 28 are parallel at the level of the conveying element 8 and run in a straight line in the horizontal transverse direction 32 at right angles to the conveying direction 10. The optical sensor 4 records light from the laser device scattered and reflected by the flow. In FIG. 5, the lines of 26, 28 each strike a root crop 22 arranged on the left and an admixture 24 arranged on the right, which scatter and reflect the light in different ways.

The separating device 20 adjusted by the adjustment signal 18 comprises a plurality of separating elements which, viewed in the conveying direction 10, are designed as ejector elements 30 arranged next to each other. These separating elements are arranged along the flow behind the measurement region. Activation of one of the ejector elements 30, which means pivoting of the ejector element 30 to the left from the position shown in FIG. 6, depends on a position of an identified component of the harvested material 12 to be separated with respect to the transverse direction 32.

The position of a further separating element, which forms a separating edge 34 comprised by the separating device 20, is also dependent on the adjustment signal. This is shifted horizontally as a function of the adjustment signal 18 in such a way that the intact root crops 22 land to the right of the separating edge 34 when the ejector elements 30 are not activated and admixtures 24 are deflected by the ejector elements 30 in such a way that they land to the left of the separating edge 34.

The invention claimed is:

1. A method for operating a root crop conveying machine comprising the following steps:
    recording sensor data by means of at least one optical sensor, which is directed to a measurement region of a flow of harvested material conveyed by at least one conveying element in a conveying direction,
    calculating mass data characterizing at least a mass of at least a part of the harvested material by an evaluation device on the basis of the sensor data,
    providing, by the evaluation device, yield data calculated at least on the basis of the mass data and reflecting at least the mass and/or a value calculated on the basis of the mass,
    generating an adjustment signal, by the evaluation device, at least on the basis of the sensor data, the mass data, and/or the yield data, the adjustment signal for adjusting at least one separating element, which in operation is arranged along the flow in front of or behind the measurement region and acts mechanically on at least a part of the harvested material, of a separating device which is designed for separating a first part of the harvested material from a further part of the harvested material.

2. The method as claimed in claim 1, wherein the evaluation device uses for the calculation of the mass data and/or for the provision of the yield data at least; sensor data of that sensor whose sensor data the evaluation device also uses for the generation of the adjustment signal.

3. The method as claimed in claim 1, wherein the evaluation device for calculating the mass data and for generating the adjustment signal distinguishes between root crops comprised by the harvested material and at least some of the admixtures comprised by the harvested material.

4. The method as claimed in claim 3, wherein the flow of harvested material in the measurement region is irradiated with laser light by at least one laser device at least substantially along a line of which the main direction of extent is arranged at an angle to the conveying direction, and the optical sensor records light of the laser device scattered and/or reflected by the flow.

5. The method as claimed in claim 4, wherein the flow is irradiated with laser light by the laser device at least substantially along at least two lines, the main directions of extent of which are each arranged at an angle to the conveying direction.

6. The method as claimed in claim 5, wherein the flow is irradiated along a first of the lines with laser light of a first wavelength and along a second of the lines with laser light of a second wavelength different from the first wavelength.

7. The method as claimed in claim 4, wherein, at least on the basis of the sensor data, the evaluation device distinguishes at least one root crop from an admixture at least on the basis of an extent of a reflection and/or a backscattering of the laser light by the respective imaged surfaces.

8. The method as claimed in claim 3, wherein the evaluation device calculates at least a proportion of the root crops or of the admixtures in the harvested material.

9. The method as claimed in claim 1, wherein the evaluation device, at least on the basis of the sensor data, calculates at least a number of root crops comprised by the harvested material and/or at least one dimension of at least part of the root crops.

10. The method as claimed in claim 1, wherein the evaluation device generates the adjustment signal in dependence on property data characterizing a property of at least one component of the harvested material, and calculated on the basis of the sensor data, and/or in dependence on a property distribution of the root crops calculated on the basis of the sensor data.

11. The method as claimed in claim 10, wherein the evaluation device calculates the yield data at least by assigning the property data or data based thereon or the property distribution or data based thereon to position or batch data.

12. The method as claimed in claim 10, wherein the property data characterizing a property includes a size of at least one component of the harvested material.

13. The method as claimed in claim 1, wherein the evaluation device calculates the yield data at least by assigning the mass data or data based thereon to position or batch data.

14. The method as claimed in claim 13, wherein the evaluation device virtually reproduces a field area on which the root crop conveying machine is used on the basis of the position data, subdivides it into area sections of the same size and assigns at least a part of the mass data or data based thereon to each area section.

15. The method as claimed in claim 1, wherein the optical sensor has at least one monochrome camera.

16. The method as claimed in claim 15, wherein the sensor data include gray values and/or depth information.

17. The method as claimed in claim 1, wherein the evaluation device identifies, on the basis of sensor data forming the basis of a first camera image and sensor data forming the basis of a second camera image, at least one image portion of at least one of the camera images that shows at least part of a background.

18. The method as claimed in claim 17, wherein the evaluation device identifies the at least one image portion on the basis of path data representing a path distance that the conveying element has traveled in the conveying direction between the recordings of the two camera images.

19. The method as claimed in claim 17, wherein the evaluation device modifies at least part of the sensor data in such a way that the image portion is at least partially removed from the camera image.

20. The method as claimed in claim 1, wherein at least on the basis of the sensor data the contours of individual root crops and/or admixtures are identified in at least one camera image of the sensor.

21. The method as claimed in claim 20, wherein the volume of individual root crops and/or admixtures are determined on the basis of stored basic data.

22. The method as claimed in claim 1, wherein the separating device is arranged downstream relative to the measurement region and in relation to the flow of harvested material.

23. The method as claimed in claim 22, wherein the separating device separates admixtures from root crops.

24. The method as claimed in claim 1, wherein the evaluation device generates the adjustment signal in dependence on a position of an identified component to be separated, of the harvested material with respect to a transverse direction.

25. The method as claimed in claim 24, wherein a plurality of ejector elements of the separating device, which are arranged next to each other as viewed in the conveying direction are activated by the adjustment signal.

26. The method as claimed in claim 25, wherein that the position of a separating edge for separating root crops and admixtures, which is comprised by the separating device and is arranged below the ejector elements, is adjusted by the adjustment signal.

27. The method claimed in claim 1, wherein the evaluation device calculates the yield data at least on the basis of operating characteristic data of the root crop conveying machine.

28. The method as claimed in claim 27, wherein the evaluation device calculates the yield data on the basis of a travel speed and/or a position of share blades of the root crop conveying machine.

29. The method claimed in claim 1, wherein the conveying element forms a plurality of root crop receiving regions which are located at least in portions at a lower level and which are delimited from one another both in the conveying direction and in the transverse direction by separating elements of the conveying element.

30. The method as claimed in claim 1, wherein a separating device includes the root crop conveying machine.

* * * * *